United States Patent [19]
Brouwer et al.

[11] Patent Number: 5,984,234
[45] Date of Patent: Nov. 16, 1999

[54] ENGINE PARAMETER ACTIVATED AIRPLANE EXIT LOCKING SYSTEM

[75] Inventors: Todd B. Brouwer, Duvall; Donald E. Ham; Taiboo Song, both of Bothell, all of Wash.

[73] Assignee: The Boeing Company, Seattle, Wash.

[21] Appl. No.: 08/951,441

[22] Filed: Oct. 15, 1997

[51] Int. Cl.$^6$ ....................................................... B64C 1/14
[52] U.S. Cl. .......................................................... 244/129.5
[58] Field of Search ............................ 244/129.5, 129.4, 244/137.1, 118.5

[56] References Cited

U.S. PATENT DOCUMENTS

| | | | |
|---|---|---|---|
| 3,722,615 | 3/1973 | Okada et al. | 180/112 |
| 3,830,332 | 8/1974 | Fontaine | 180/113 |
| 3,871,474 | 3/1975 | Tomlinson et al. | 180/112 |
| 4,042,193 | 8/1977 | Cerne et al. | 244/129 |
| 4,915,326 | 4/1990 | Plude | 244/129 |
| 5,251,851 | 10/1993 | Herrmann et al. | 244/129.5 |
| 5,480,109 | 1/1996 | Klein et al. | 244/129 |
| 5,735,487 | 4/1998 | Abild et al. | 244/129.5 |

*Primary Examiner*—Theresa M. Wesson
*Attorney, Agent, or Firm*—Robert R. Richardson

[57] ABSTRACT

An aircraft locking system (11) is provided that avoids inadvertent or deliberate operation of an aircraft exit opening means (50) during take-off roll, in-flight, or during landing. The aircraft locking system includes means for determining whether engines of the aircraft are running (12), means for determining thrust lever position (14), means for determining whether the aircraft is in an air mode or a ground mode (16), and means for determining whether a predetermined number of service/entry doors are closed (18). Means for generating a lock/unlock signal (32, 40) are responsive to the engine running determining means, the thrust lever position determining means, and the service/entry door-closed determining means.

21 Claims, 3 Drawing Sheets

ENGINE PARAMETER ACTIVATED AIRPLANE EXIT LOCKING SYSTEM

BACKGROUND OF THE INVENTION

1. Field of the Invention

This invention relates to aircraft exit door locking systems and, more particularly, to an automatic flight locking system for avoiding inadvertent or deliberate operation of an airplane exit opening means during take-off roll, in-flight, or landing.

2. Background Information

Inadvertent or deliberate opening of an aircraft exit during take-off, in-flight, or during landing can result in severe damage to the aircraft as well as injuries to crew members or passengers. For example, an exit door opened in-flight may be subjected to air and inertial loads that are sufficient to cause door separation and can result in damage from impact of the door with the aircraft structure, ground personnel, or property. Also, opening a door on a pressurized airplane can result in a decompression, thereby resulting in potential harm to passengers and the airplane structure. Of particular concern are doors that are not quickly and easily accessible to cabin crews, such as emergency exits like over-wing hatches and upper-deck canopy doors.

Currently, Federal Aviation Administration (FAA) Advisory Circular (AC) 25.783-1 states that it is not considered acceptable to rely solely on cabin pressure to prevent an inadvertent opening of doors in-flight due to door-opening incidents during unpressurized flight, such as during taxiing and landing. The FAA AC also states that all doors should therefore incorporate features in the locking mechanism that provide positive means for preventing the door from vibrating open or from being opened inadvertently by passengers or crew members. Further, the FAA AC states that this positive means should be effective throughout the approved operating envelope of the aircraft, such as takeoff, flight, and landing, and should not complicate the opening of passenger emergency exits under emergency conditions.

Prior attempts to prevent the inadvertent opening of aircraft exits have monitored air/ground logic and dynamic environmental parameters, such as inertial pitot logic, reference logic, and wheel speed. For example, see U.S. Pat. No. 4,915,326. Such a lock system requires sophisticated sensors and processing capabilities to gather and process the dynamic environmental data in order to perform its locking function. This dynamic environmental data is not readily or easily obtained on older or less sophisticated aircraft.

Thus, there is an unmet need in the art for an automatic flight lock system that avoids inadvertent or deliberate operation of an airplane exit opening means during take-off roll, in-flight, or during landing.

BRIEF SUMMARY OF THE INVENTION

An aircraft locking system is provided that avoids inadvertent or deliberate operation of an aircraft exit opening means during take-off roll, in-flight, or during landing. The aircraft locking system is activated by engine parameters and includes means for determining whether engines of the aircraft are running, means for determining thrust lever position, means for determining whether the aircraft is in an air mode or a ground mode, and means for determining whether a predetermined number of service/entry doors are closed. Means for generating a lock/unlock signal are responsive to the engine running determining means, the thrust lever position determining means, and the door-closed determining means.

According to an aspect of the present invention, the lock/unlock signal generating means generates a lock signal when at least one engine is running, the predetermined number of service/entry doors are closed, and either the airplane is in the air mode or all thrust levers are in a take-off position. Because the aircraft exit door is locked when an engine is running, the present invention prevents unnecessary cycling of an aircraft exit door lock actuator and also protects against possible ingestion into the aircraft engine. Because the aircraft exit door is locked when less than all of the aircraft service/entry doors are closed, the aircraft exit door remains locked in the event that the airplane is dispatched with a failed door open/closed sensor. By locking the aircraft exit door when the thrust levers are in the take-off position, the exit doors are locked when the pilot intends to take-off. When the thrust levers are retracted from the takeoff position to the flight idle position during flight, the exit doors remain locked because the airplane is in the air mode.

According to another aspect of the present invention, the lock/unlock signal generating means generates an unlock signal when less than the predetermined number of service/entry doors are closed. This override feature allows the exit door to be unlocked with an engine running and the aircraft in the air mode. This override feature is desirable to unlock the exit doors in the extent of an emergency landing with at least an engine running and the landing gear up. However, an intentional effort by the flight crew or trained flight attendants to open service/entry doors ensures that unlocking the exit doors is desired when an engine is running.

According to another aspect of the present invention, the lock/unlock signal generating means further generates an unlock signal when no engines are running. This feature prevents unnecessary cycling of the exit door lock actuator during maintenance when no engines are running.

According to a further aspect of the present invention, the lock/unlock signal generating means further generates an unlock signal when any thrust lever is out of the take-off position and the aircraft is in a ground mode. This features ensures that the aircraft exit doors are unlocked when the airplane is on the ground and the pilot does not intend to take-off.

DETAILED DESCRIPTION OF THE INVENTION

Figure 1:
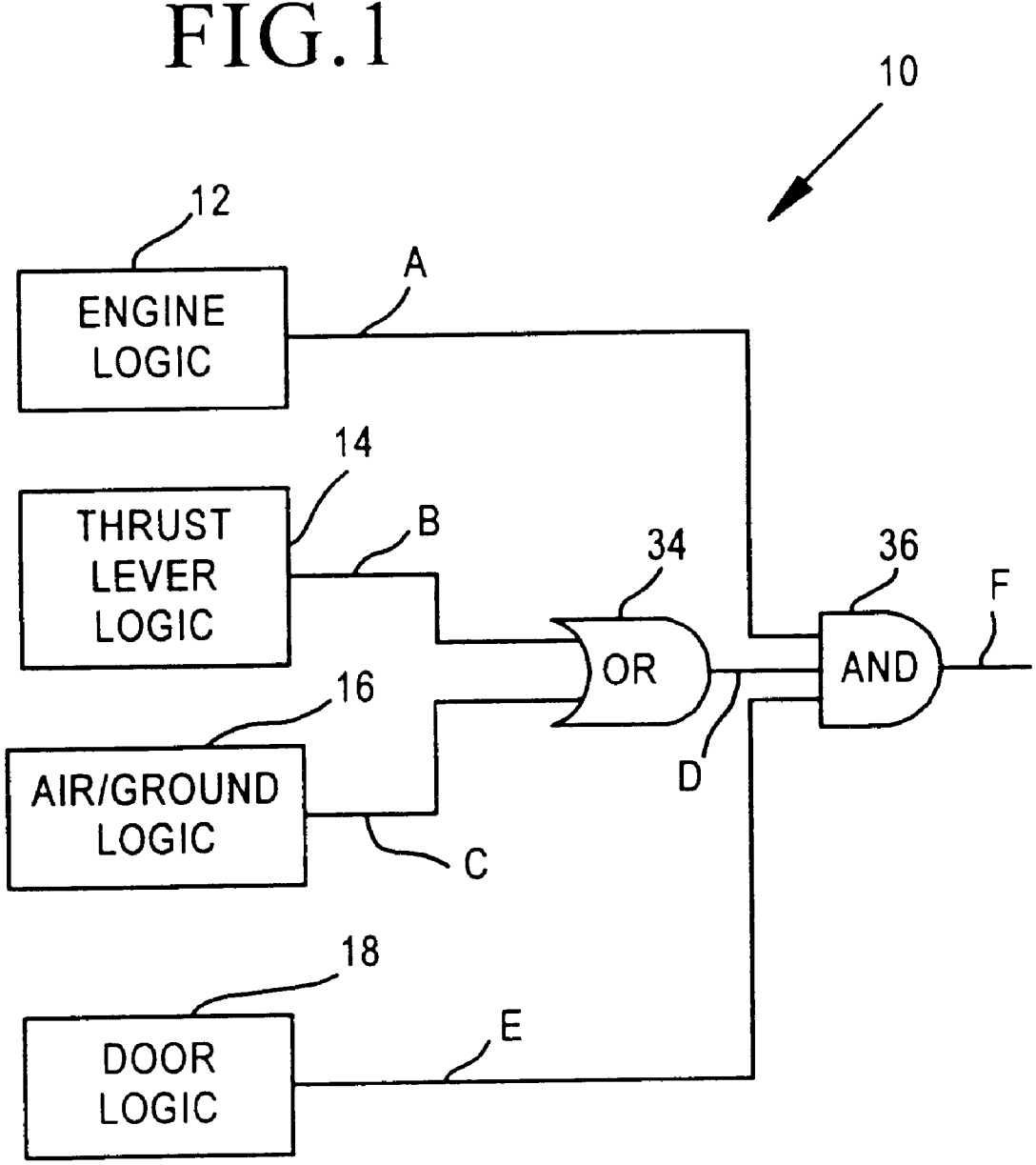
FIG. 1 is a logic diagram of a presently preferred embodiment of the present invention.
Figure 2:
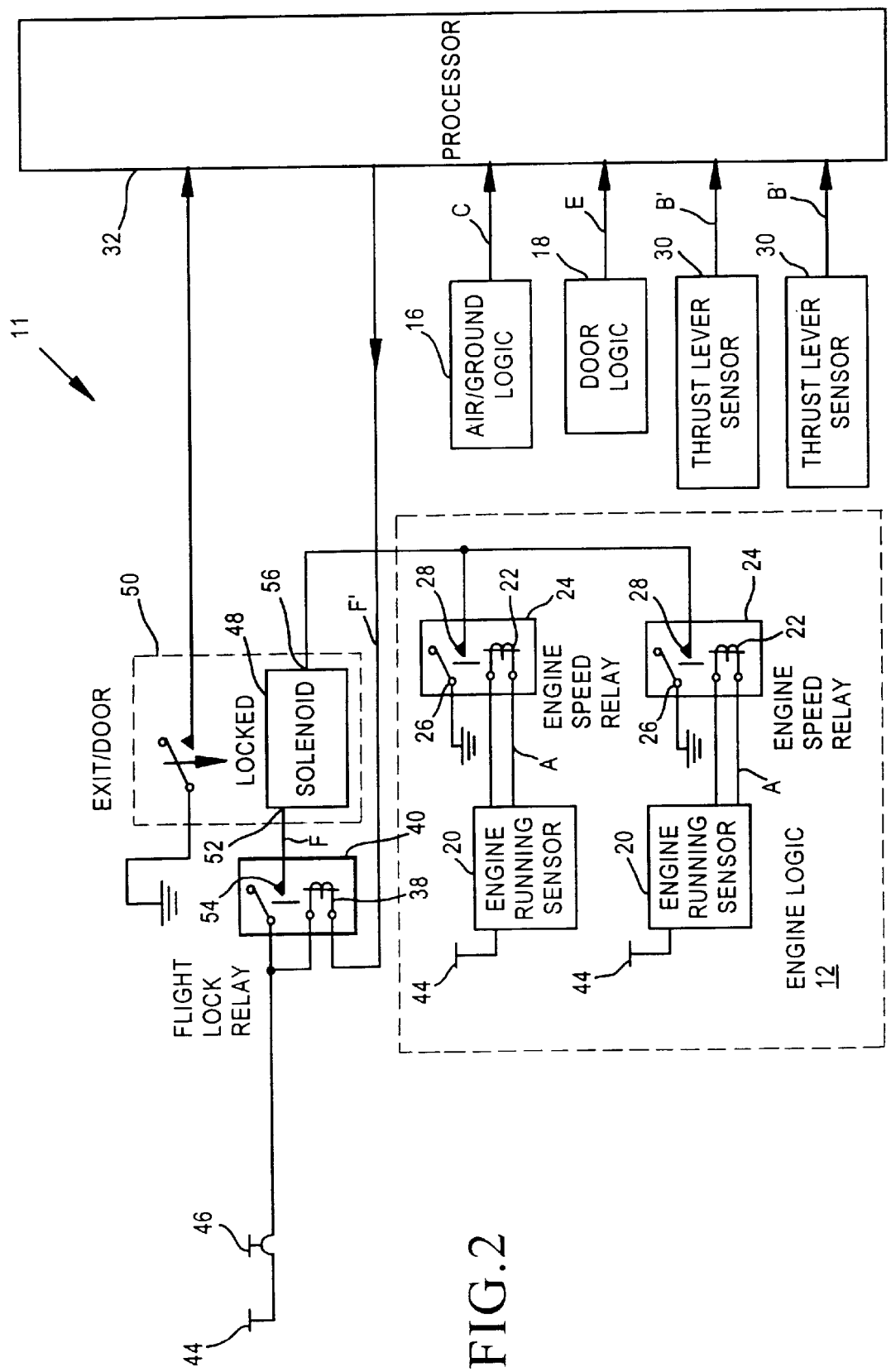
FIG. 2 is a schematic diagram of a system that implements the logic of FIG. 1.

FIG. 1 shows a lock logic 10 that operates on separate logic signals that are representative of various aircraft parameters, including engine parameters, in making a determination of whether an aircraft exit door should be locked or unlocked. The lock logic 10 receives inputs from engine logic 12, thrust lever logic 14, air/ground logic 16, and door logic 18. Referring now to FIGS. 1 and 2, a lock flight system 11 implements the lock logic 10 and generates a lock/unlock signal F, and an exit door lock actuator 50 either locks or unlocks the aircraft exit door in response to the lock/unlock signal F.

The engine logic 12 generates a signal A when any engine is running. It is desirable to input engine status to the lock logic 10 because, normally, the aircraft engines should not be running when the exit doors are opened to protect against possible ingestion into the engines. Further, it is desirable to prevent unnecessary cycling of the exit door lock actuator 50 during maintenance when the engines are shut down. Engine-running sensors 20 are provided for each of two engines. While two engine-running sensors 20 are shown, it will be appreciated that the present invention is applicable to aircraft with any number of engines, each engine having its own engine-running sensor 20. The engine-running sensors 20 generate a signal A that indicates its associated engine is running. For example, the engine-running sensor 20 suitably indicates that its associated engine is running when the engine compressor speed is greater than or equal to 50% of maximum engine compressor speed. The engine-running sensor 20 is suitably a known sensor for monitoring aircraft engine status. The signal A is provided to an energizing coil 22 of a relay 24. The signal A has a voltage level sufficient to activate the relay 24, and is suitably a 28 volt DC signal provided to the engine-running sensors 20 from an electrical power source 44. A terminal 26 of the relay 24 is electrically connected to ground. Another terminal 28 of the relay 24 is provided for interfacing the engine logic 12 with the flight lock system 11, as will be described below.

The thrust lever logic 14 generates a signal B when all thrust levers are advanced to a take-off position. This feature ensures that the exit door is locked when the pilot intends to take off. The take-off position is the thrust lever resolver angle at which take-off thrust is applied. For example, the take-off position may correspond to a thrust lever resolver angle of greater than 53 degrees. However, it will be appreciated that take-off position can vary for different aircraft. A thrust lever sensor 30 for each thrust lever generates a signal B' when its associated thrust lever is in the take-off position. The signals B' are provided to a processor 32 running a suitable software routine that makes a determination when all thrust levers are in the take-off position. The processor 32 is any suitable processor that is known in the art, such as a 68000 processor available from the Motorola Corporation. It will be appreciated that the determination that all thrust levers are in a take-off position is also suitably implemented in hardware by providing the signals B' to the input terminals of an AND gate (not shown). It will also be appreciated that a logic AND operation on the signals B' is suitably implemented with relays.

The air/ground logic 16 generates a signal C that is indicative of whether the aircraft is in an air mode or a ground mode. The air/ground logic 16 is suitably a known air/ground system. In the air/ground logic 16, either rotation of the main landing gear truck or an extension of the main landing oleo, both of which are motion inputs, activates a switch or switches The switches can also be activated by compression of the landing gear due to weight of the airplane. The activation of these switches determines if the landing gear have left the ground or have contacted the ground based on the previous states of the switches. If the landing gear have left the ground surface, the signal C is provided to the processor 32 with a suitable level that is indicative of a logic 1. If the landing gear have contacted the ground, the signal C is provided to the processor 32 with a suitable level that is indicative of a logic 0. If desired, a suitable time delay of a predetermined time period, such as about 5 seconds, can be inserted such that the signal C assumes a value indicative of a logic 0 after the air/ground system is in the ground mode for the predetermined time period. This time delay ensures that the pilot intends that the aircraft remain on the ground before the signal C assumes a logic 0 value and the exit doors can be unlocked.

The signal B from the thrust lever logic 14 and the signal C from the air/ground logic 16 are provided to the processor 32. The processor 32 performs a logic OR 34 on the signals B and C and generates a signal D. It will again be appreciated that the logic OR 34 is also suitably implemented with an OR gate or with relays. It is desirable to perform a logical OR operation on the signal B from the thrust lever logic 14 and the signal C from the air/ground logic 16 in order to maintain the exit doors locked in flight after the thrust levers have been retracted from the takeoff thrust position to the flight idle position. Because the air/ground system is in the air mode when the thrust levers are retracted to the flight idle position, the logical OR 34 ensures that the change in thrust lever position does not cause the exit door to become unlocked.

The door logic 18 generates a signal E that is indicative of the open or closed status of the service/entry doors of the aircraft. According to the present invention, the door logic 18 provides an override that permits the exit doors of the aircraft to be unlocked in the event of an emergency landing in which an engine remains running and the landing gear remain up. In a presently preferred embodiment, the signal E assumes a value that is indicative of a logic 1 when all but one service/entry door are closed. Because not all service/entry doors need be closed in order to generate a lock signal, dispatch of the airplane with a failed door open/closed sensor can occur and the exit doors can remain locked. Also, the signal E suitably assumes a value indicative of a logic 0 when two or more service/entry doors have been opened. This features ensures that in order to unlock the exit doors with an engine running and the air/ground logic 16 indicating an air mode, such as during an emergency landing with an engine running and the landing gear up, a concerted, intentional action on the part of the flight crew is taken. Because the service/entry doors are monitored and operated by crew members or trained flight attendants, the opening of two service/entry doors in an emergency situation, such as the emergency landing described above, ensures that the flight crew has made a determination that the exit doors may be opened with an engine running. It will be appreciated that it is not necessary that the signal E assume values based on the number of open service/entry doors and closed service/entry doors discussed above. Rather, the signal E can assume the values indicative of a logic 1 and a logic 0 as desired.

The signals A, D, and E are combined with a logic AND 36 and a lock/unlock signal F is generated. The logic AND 36 is implemented as follows in a presently preferred embodiment of the invention. The signals D and E are suitably combined with a logic AND operation by the processor 32. However, it will be appreciated that the AND operation signals D and E are suitably performed with an AND gate or with relays. The result of the AND operation between the signals D and E is provided as a signal F' to an energizing coil 38 of a relay 40. The relay 40 has a terminal 42 that is electrically connected to the electrical power source 44, such as a 28-volt DC bus. For control and safety purposes, a circuit breaker 46 may be inserted between the electrical power source 44 and the terminal 42. A solenoid 48 of an exit door lock actuator 50 has a terminal 52 that is electrically connected to another terminal 54 of the relay 40. A terminal 56 of the solenoid 48 is electrically connected to the terminals 28 of the relays 24. It will be appreciated that the exit door lock actuator 50 need not include the solenoid 48, but also suitably includes a motor or an actuator such as a linear actuator. When all but one service/entry door are closed and either all thrust levers are advanced to the take-off position or the air/ground system is in the air mode, the signal F' energizes the energizing coil 38 of the relay 40. The relay 40 closes and the electrical power source 44 is connected to the solenoid 48. When an engine is running, the signal A energizes the energizing coil 22 of the relay 24. The relay 24 closes, thus providing a current path from the terminal 56 of the solenoid 48 to ground through the terminals 26 and 28 of the relay 24. This energizes the solenoid 48 and actuates the exit door actuator 50, thus locking the door.

It will be appreciated that electrically connecting the engine logic 12 to the terminal 56 of the solenoid 48 provides an input path from the engine logic 12 that is independent of the path from the thrust lever logic 14. This feature contributes to reliability of a lock signal. However, it will also be appreciated that the engine logic 12 suitably provides the signal A to the processor 32 for combining with the signals D and E in a logic AND operation. As discussed above, the logic AND operation is also suitably performed with an AND gate or relays.

Having described the lock logic 10 and flight lock system 11, it will be appreciated that the signal F is a lock signal that is provided from the electrical power source 44 to the solenoid 48 via the relays 40 and 24. From the above discussion, it will be appreciated that the signal F is provided to the solenoid 48 as a lock signal when at least one engine is running, thus closing the relay 24; the predetermined number of doors are closed as sensed by the door logic 18; and either the airplane is in the air mode as sensed by the air/ground logic 16 or all thrust levers are in the take-off position as sensed by the thrust lever logic 14.

It will also be appreciated that the signal F is an unlock signal when either the relay 40 or all the relays 24 are opened. This condition causes an open circuit to exist between the electrical power source 44 and ground, thus de-energizing the solenoid 48 and unlocking the exit door lock actuator 50. The signal F is an unlock signal when less than the predetermined number of doors are closed as sensed by the door logic 18. This condition opens the relay 40. The signal F is also an unlock signal when no engines are running as sensed by the engine logic 12. This condition opens all the relays 24. The signal F is an unlock signal when any thrust lever is out of a take-off position as sensed by the thrust lever logic 14 and the aircraft is in a ground mode as sensed by the air/ground logic 16. This condition opens the relay 40.

Figure 3:
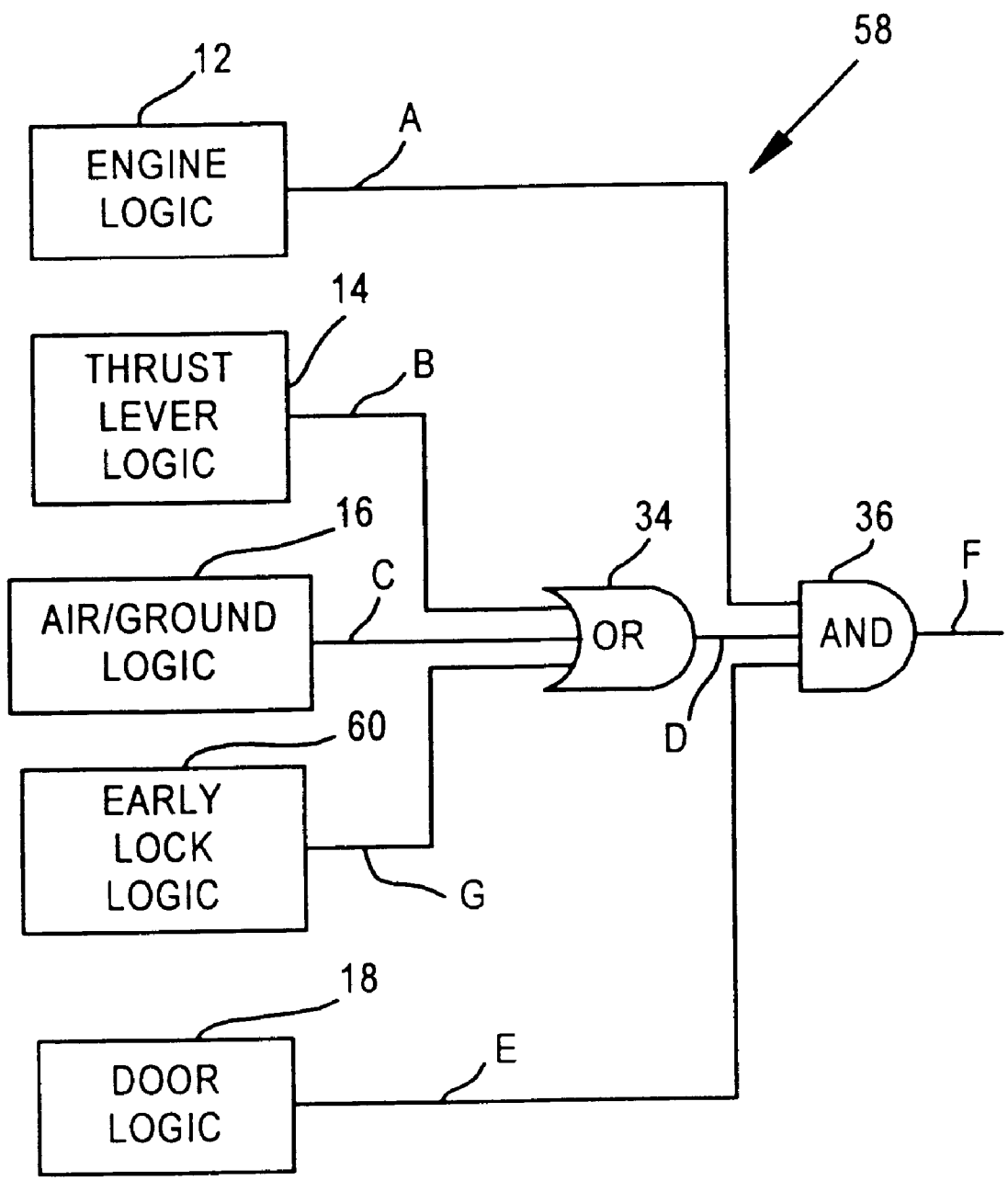
FIG. 3 is a logic diagram of another preferred embodiment of the present invention.

FIG. 3 shows a lock logic 58 for another preferred embodiment of the present invention that permits the aircraft exit doors to be locked earlier than is permitted by the logic 10 (FIG. 1). The lock logic 58 includes an early lock logic 60 that provides a signal G to the OR logic 34. The signal G assumes a value indicative of a logic 1 when all service/entry doors are closed. Because, the early lock logic 60 provides an additional input to the OR logic 34, the signal D can assume a logic 1 value before all thrust levers are advanced to the take-off position or before the air/ground system is in the air mode. This is desirable for determining whether the flight lock system is operational before take-off thrust is applied. In a presently preferred embodiment, the early lock logic 60 is suitably disabled if an attempt is made to open the exit door before all thrust levers are advanced to the take-off position. The early lock logic 60 is also suitably disabled if all thrust levers are advanced to the take-off position, and then any thrust lever is subsequently placed in a non-take-off position.

It will be appreciated that, although various embodiments of the invention have been described herein for purposes of illustration, modifications may be made without departing from the spirit and scope of the invention. Accordingly, the invention is not limited except as by the appended claims. For example, the logic operations performed by the processor 32 that is running an acceptable software routine are also suitably performed by logic gates or by relays. Also, the engine logic 12 may suitably provide its input to the processor 32, or logic gates or relays that implement the logic functions performed by the processor 32. Further, it will be appreciated that the invention is not limited to aircraft emergency exits, such as over-wing hatches and upper-deck canopy doors. For example, the present invention can be used to ensure that escape slides do not deploy during take-off roll, in-flight, or during landing. The present invention could also be used to ensure that any component is locked, enabled, or disabled during the flight envelope, as desired, such as in-flight service items that are locked during the flight envelope; high energy transmission systems that are enabled during take-of in-flight, and landing; or automatic self-test diagnostic systems for processor-based control and indication systems that are disabled during take-off, in-flight, and landing.

We claim:

1. An aircraft locking system comprising:
   means for determining whether engines of the aircraft are running;
   means for determining thrust lever position;
   means for determining whether the aircraft is in an air mode or a ground mode;
   means for determining whether a predetermined number of service/entry doors are closed; and
   means for generating a lock/unlock signal responsive to the engine-running determining means, the thrust lever position determining means, and the service/entry door-closed determining means.

2. The aircraft locking system of claim 1, wherein the lock/unlock signal generating means generates a lock signal when:
   at least one engine is running;
   the predetermined number of service/entry doors are closed; and
   the airplane is in the air mode or all thrust levers are in a take-off position.

3. The aircraft lock system of claim 1, wherein the lock/unlock signal generating means generates an unlock signal when less than the predetermined number of service/entry doors are closed.

4. The aircraft lock system of claim 1, wherein the lock/unlock signal generating means further generates an unlock signal when no engines are running.

5. The aircraft locking system of claim 1, wherein the lock/unlock signal generating means further generates an unlock signal when:
   any thrust lever is out of a take-off position; and
   the aircraft is in a ground mode.

6. The aircraft locking system of claim 5, wherein the lock/unlock signal generating means generates the unlock signal after the aircraft is in the ground mode for a predetermined time.

7. The aircraft locking system of claim 1, wherein the means for generating the lock/unlock signal further includes a relay having an energizing coil.

8. The aircraft locking system of claim 7, further comprising:

a lock actuator including a solenoid having a first terminal that is electrically connected to the relay and a second terminal that is electrically connected to the engine-running determining means.

9. The aircraft locking system of claim 8, wherein:

the relay is electrically connected to a first voltage source having a first voltage level; and when at least one engine is running, the engine-running determining means is electrically connected to a second voltage source having a second voltage level, the second voltage level being less than the first voltage level, such that the solenoid is electrically connected between the first voltage source and the second voltage source in response to a lock signal.

10. An aircraft locking system comprising:

means for determining whether engines of the aircraft are running;

means for determining thrust lever position;

means for determining whether the aircraft is in an air mode or a ground mode;

means for determining whether a predetermined number of service/entry doors are closed;

means for generating a lock/unlock signal responsive to the engine-running determining means, the thrust lever position determining means, and the service/entry door-closed determining means, the means for generating the lock/unlock signal including a relay having an energizing coil; and a lock actuator including a solenoid having a first terminal that is electrically connected to the relay and a second terminal that is electrically connected to the engine-running determining means, the relay being electrically connected to a first voltage source having a first voltage level, and the engine-running determining means being electrically connected to a second voltage source having a second voltage level when at least one engine is running, the second voltage level being less than the first voltage level, such that the solenoid is electrically connected between the first voltage source and the second voltage source in response to a lock signal.

11. The aircraft locking system of claim 10, wherein the lock/unlock signal generating means generates a lock signal when:

at least one engine is running;

a predetermined number of service/entry doors are closed; and the airplane is in the air mode or all thrust levers are in a takeoff position.

12. The aircraft locking system of claim 10, wherein the lock/unlock signal generating means generates an unlock signal when less than the predetermined number of doors are closed.

13. The aircraft locking system of claim 10, wherein the lock/unlock signal generating means further generates an unlock signal when no engines are running.

14. The aircraft locking system of claim 10, wherein the lock/unlock signal generating means further generates an unlock signal when:

any thrust lever is out of a take-off position; and the aircraft is in a ground mode.

15. The aircraft locking system of claim 14, wherein the lock/unlock signal generating means generates the unlock signal after the aircraft is in the ground mode for a predetermined time.

16. An aircraft locking system comprising:

means for determining whether engines of the aircraft are running;

means for determining thrust lever position;

means for determining whether the aircraft is in an air mode or a ground mode;

means for determining whether all service/entry doors are closed;

means for determining whether a predetermined number of service/entry doors are closed; and means for generating a lock/unlock signal responsive to the engine-running determining means, the thrust lever position determining means, the all service/entry door-closed determining means, and the predetermined service/entry door-closed determining means, the lock/unlock signal generating means generating a locking signal when:

at least one engine is running;

a predetermined number of service/entry doors are closed; and the airplane is in the air mode or all thrust levers are in a take-off position or all service/entry doors are closed.

17. The aircraft locking system of claim 16, wherein the lock/unlock signal generating means generates an unlock signal when less than the predetermined number of service-entry doors are closed.

18. The aircraft locking system of claim 16, wherein the lock/unlock signal generating means further generates an unlock signal when no engines are running.

19. The aircraft locking system of claim 16, wherein the lock/unlock signal generating means further generates an unlock signal when:

any thrust lever is out of a take-off position; and the aircraft is in a ground mode.

20. The aircraft locking system of claim 19, wherein the lock/unlock signal generating means generates the unlock signal after the aircraft is in the ground mode for a predetermined time.

21. The aircraft locking system of claim 16, wherein the all service/entry door-closed determining means is disabled when an attempt is made to open an aircraft exit door before all thrust levers are advanced to a take-off position.

\* \* \* \* \*